United States Patent [19]

Frank et al.

[11] Patent Number: 5,716,999
[45] Date of Patent: Feb. 10, 1998

[54] POLYARYLENE SULFIDE FOAMS AND A PROCESS FOR THEIR PRODUCTION

[75] Inventors: Georg Frank, Tübingen; Jürgen Kulpe, Dinslaken; Andreas Schleicher, Beselich; Helmut Scheckenbach, Langen, all of Germany

[73] Assignee: Hoechst Aktiengesellschaft, Germany

[21] Appl. No.: 793,217

[22] PCT Filed: Aug. 2, 1995

[86] PCT No.: PCT/EP95/03080

§ 371 Date: May 2, 1997

§ 102(e) Date: May 2, 1997

[87] PCT Pub. No.: WO96/05246

PCT Pub. Date: Feb. 22, 1996

[30] Foreign Application Priority Data

Aug. 15, 1994 [DE] Germany ............... 44 28 737.2

[51] Int. Cl.$^6$ ................................................. C08J 9/02
[52] U.S. Cl. .................. 521/77; 521/134; 521/180; 521/189; 521/79
[58] Field of Search ................ 521/77, 79, 134, 521/180, 189

[56] References Cited

U.S. PATENT DOCUMENTS

| 3,867,189 | 2/1975 | Edmonds, Jr. | 521/91 |
| 3,998,767 | 12/1976 | Walton | 521/77 |
| 4,840,758 | 6/1989 | Thorsrud | 521/95 |
| 4,885,321 | 12/1989 | Nitoh et al. | 521/54 |
| 5,114,983 | 5/1992 | Stahlke et al. | 521/95 |
| 5,126,380 | 6/1992 | Stahlke et al. | 521/138 |

*Primary Examiner*—Morton Foelak
*Attorney, Agent, or Firm*—Connolly & Hutz

[57] ABSTRACT

A foamed polyarylene sulfide according to the invention has a density which is reduced by at least 50% compared with the theoretical density of nonfoamed material, and is expediently produced by subjecting a polyarylene sulfoxide as such or a mixture of one or more polyarylene sulfides with a polyarylene sulfoxide to heat treatment. The temperature of the heat treatment is in the range from 250° to 400° C.

9 Claims, No Drawings

POLYARYLENE SULFIDE FOAMS AND A PROCESS FOR THEIR PRODUCTION

The invention relates to polyarylene sulfide foams and a process for their production by heating polyarylene sulfides which contain sulfoxide groups or a polyarylene sulfoxide.

Polyphenylene sulfide foams have been produced to date from polyphenylene sulfide (PPS for short) by addition of 3 to 5% by weight of a blowing agent concentrate (EP-A-0 406 634 or U.S. Pat. No. 5,114,983). Azo compounds, anhydrides or azoles are used as blowing agents. The mixture is processed and foamed at temperatures of 300° to 360° C., which are customary for polyarylene sulfides. A reduction in density of about 40 to 45% can be achieved in the polyphenylene sulfide foamed in this way, the term "reduction in density" being understood as meaning a percentage reduction in the density of the foamed material, based on the density of the non-foamed starting material.

Foam sheets of high heat distortion resistance can be produced from a mixture of 80 to 99% of styrene polymer and 1 to 20% by weight of 1,4-polyphenylene sulfide and customary blowing additives, such as propane, butane, pentane, chlorohydrocarbons, fluorochlorohydrocarbons or $CO_2$, by extrusion at 100° to 200° C. (EP-A-0 443 393; U.S. Pat. No. 5,106,684). These foam sheets have thermal conductivities of between 0.024 and 0.030 watt.meter$^{-1}$.kelvin$^{-1}$ and contain 90 to 95% of closed cells having a cell diameter of 0.1 to 0.2 mm.

Polyphenylene sulfide with a low degree of foaming (U.S. Pat. No. 4,471,247), which can be used as an electrical insulating or heat removal medium for coils and pole shoes in railway electric motors, can be obtained by heating PPS material which comprises volatile impurities. The density of the heat-treated material is between 5 and 10% below the density of the starting material. This reduction in density is too low for many uses, for example as thermal insulation material. A blowing agent must also be added here for greater foaming of the material.

Foaming of high-melting polymers without the customary blowing agents or blowing gases with a degree of reduction in density of more than 10% is either not possible or presents difficulties.

The object of the invention was the development of a process for the production of polyarylene sulfide foams which does not require the addition of customary blowing agents to the polymer to be foamed and which nevertheless allows a high degree of foaming.

It has been found that polyarylene sulfoxides and mixtures thereof with polyarylene sulfides form a foam when heated. On heating, sulfoxide groups of the polyarylene sulfoxides are converted into sulfide groups and oxygen, which acts as an expanding agent, is released in the process.

The invention thus relates to a process for the production of polyarylene sulfide foam, which comprises heating at least one polyarylene sulfoxide or a mixture of one or more polyarylene sulfides and at least one polyarylene sulfoxide.

Polyarylene sulfides, which are also called polyarylene thioethers, are understood as meaning compounds which contain at least one arylene sulfide unit (—Ar—S—; Ar=arylene). Arylenes are, for example, phenylene, biphenyldiyl (—$C_6H_4$—$C_6H_4$—), naphthalenediyl, anthracenediyl or phenanthrenediyl, which can be mono- or polysubstituted. Substituents are, for example, straight-chain, cyclic or branched $C_1$-$C_{20}$—hydrocarbon radicals, such as $C_1$-$C_{10}$—alkyl radicals, for example, methyl, ethyl, n-propyl, iso-propyl, n-butyl, t-butyl or n-hexyl, or $C_6$-$C_{14}$—aryl radicals, for example phenyl or naphthyl; and halogens or sulfonic acid, amino, nitro, cyano, hydroxyl or carboxyl groups.

Polyarylene sulfides are, for example, compounds which contain units of the formula

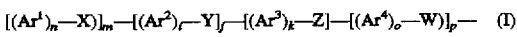

$$[(Ar^1)_n—X]_m—[(Ar^2)_i—Y]_j—[(Ar^3)_k—Z]—[(Ar^4)_o—W]_p— \quad (I)$$

in which $Ar^1$, $Ar^2$, $Ar^3$, $Ar^4$, W, X, Y and Z independently of one another are identical or different. The indices n, m, i, j, k, o and p independently of one another are zero or the integers 1, 2, 3 or 4, and their sum must be at least 2, and $Ar^1$, $Ar^2$, $Ar^3$ and $Ar^4$ in formula (I) are arylene systems having 6 to 18 carbon atoms, for example phenylene, biphenyldiyl (—$C_6H_4$—$C_6H_4$—), naphthalenediyl, anthracenediyl or phenanthrenediyl, which can be mono- or polysubstituted. W, X, Y and Z are divalent linking groups chosen from —$SO_2$—, —S—, —SO—, —CO—, —O—, —$CO_2$—, or alkylene or alkylidene groups having 1 to 6, preferably 1 to 4, carbon atoms. The aryl groups $Ar^1$, $Ar^2$, $Ar^3$ and $Ar^4$ of formula (I) can optionally and independently of one another contain one or more functional groups, for example straight-chain or branched alkyl radicals, such as methyl, ethyl, n-propyl, iso-propyl, n-butyl or t-butyl; or halogens or sulfonic acid, amino, nitro, cyano, hydroxyl or carboxyl groups. Block copolymers of units of the formula (I) can also be employed.

Polyarylene sulfoxides are understood as meaning polymers which contain at least one arylene sulfoxide unit (—Ar—SO—; Ar=arylene). Arylenes are, for example, phenylene, biphenyldiyl (—$C_6H_4$—$C_6H_4$—), naphthalenediyl, anthracenediyl or phenanthrenediyl, which can be mono- or polysubstituted. Substituents are, for example, straight-chain, cyclic or branched $C_1$-$C_{20}$—hydrocarbon radicals, such as $C_1$-$C_{10}$—alkyl radicals, for example methyl, ethyl, n-propyl, iso-propyl, n-butyl, t-butyl or n-hexyl, or $C_6$-$C_{14}$—aryl radicals, for example phenyl or naphthyl; or halogens or sulfonic acid, amino, nitro, cyano, hydroxyl or carboxyl groups.

The terms "polyarylene sulfides" and "polyarylene sulfoxides" can overlap. Polyarylene sulfides with units of the formula (I) can also contain sulfoxide groups. These polyarylene sulfides can then also be regarded as polyarylene sulfoxides. Formula (I) accordingly also gives examples of polyarylene sulfoxides if at least one sulfoxide group (—SO—) is contained among the linking groups W, X, Y and Z. To achieve a foaming effect, at least 0.1%, more advantageously 1% to 100% and in particular 5% to 100%, of the total of the linking groups W, X, Y and Z in formula (I) in polyarylene sulfoxides with units of the formula (I) should comprise —SO— linking groups.

Polyarylene sulfoxides which consist of repeating units of the formula (I) can be obtained, for example, from polyarylene thioethers or polyarylene thioethers containing sulfone groups by oxidation (for example with ozone).

Polyarylene thioethers, in particular polyphenylene sulfide, can be prepared on the basis of reacting dihalogenated aromatics with sodium sulfide by the method of EDMONDS and HILL. Polyarylene thioethers and their preparation are described in "Ullmann's Encyclopedia of Industrial Chemistry", Volume A21, B. Elvers, S. Hawkins and G. Schulz (Editors), VCH, Weinheim-N.Y. 1992, pages 463–472), to which reference is made. Polyphenylene sulfide, which is preferably used for the preparation of a polyarylene sulfoxide, in general consists of 1,4-linked phenylene sulfide units (—[—$C_6H_4$—S—]—), which can have up to a content of 30 mol percent of a 1,2- and/or 1,3-linkage on the aromatic nucleus. The polyphenylene sulfide can consist of linear or crosslinked polymer chains.

The synthesis of polyarylene thioethers containing sulfone groups is described in Chimia 28(9), (1974) 567.

The oxidation of the polyarylene sulfides can be carried out such that only some of the sulfide bridges are converted into sulfoxide groups (incomplete oxidation, for example by the use of less than the stoichiometric amounts of oxidizing agent). Such oxidation products are included in the term polyarylene sulfoxides. The oxidation conditions can also be adjusted (temperature, ozone concentration) such that sulfone bridges are also formed, in addition to sulfoxide bridges.

Polyarylene sulfoxides can be prepared, for example, by oxidation with ozone, as described in German Patent Application No. P 43 14 736.4 filed on 4 May 1993 with the title "Oxidation of polyarylene sulfides", to which reference is made.

The foaming effect which can be achieved depends on the nature of the polyarylene sulfoxide (amount of sulfoxide groups in the polyarylene sulfoxide) and the content of polyarylene sulfoxide in the polymer to be foamed or the polymer mixture. For example, it is possible to produce a foam which has a density reduced by more than 50% compared with the starting material by heating polyphenylene sulfoxide.

During the heating by the process according to the invention, sulfoxide groups in the polymer or in the polymer mixture are converted into sulfide groups.

The starting polymers or the polymer mixture can be heated in a temperature range from 250° to 400° C. The temperature is usually in the range from 300° to 360° C.

Polyarylene sulfoxides which have an average molecular weight $M_w$ of 4000 to 200,000, preferably 10,000 to 150,000, in particular 25,000 to 10,0000, are in general suitable for the invention.

Mixtures of various polyarylene thioethers, as the polyarylene sulfide system, or mixtures of various polyarylene sulfoxides can also be employed according to the invention.

The production of a polyarylene sulfide foam does not have to start from a mixture of a polyarylene sulfide with a polyarylene sulfoxide, it can also start from a polyarylene sulfoxide alone. Foamed polyphenylene sulfide can thus be obtained by heating a corresponding polyphenylene sulfoxide.

The polymer mixtures or the polyarylene sulfoxide can be employed as powders, moldings, fibers, films or shaped articles for the production of the foam. Powders here have, for example, commercially available particle sizes, and granules can also be used. If the polymers are used as fibers, these are employed as staple fibers, microfibers, needle felt, nonwoven material, card sliver or woven fabric. Films or film scraps can also be used in a suitable form.

The polyarylene sulfoxides should be used in powder form in order to achieve a uniform foam. The average particle size ($D_{50}$ value) is in the range from $0.3\times10^{-6}$ to $500\times10^{-6}$ m, preferably $0.5\times10^{-6}$ to $300\times10^{-6}$ m, particularly preferably $0.5\times10^{-6}$ to $200\times10^{-6}$ m.

The starting polymers, that is to say polyarylene sulfides or polyarylene sulfoxides, can in general be employed as non-blended material. However, the addition of customary fillers, for example chalk, talc, clay or mica, and/or fibrous reinforcing agents, such as glass fibers and carbon fibers or whiskers, and other customary additives and processing auxiliaries, for example lubricants, mold release agents, antioxidants and UV stabilizers, is also possible.

The invention also relates to foamed polyarylene sulfides having a density which is reduced by at least 50 percent compared with the nonfoamed material.

The foamed polyarylene sulfides can have a density which is reduced by 55 to 65%. Foams having a reduction in density of greater than 65% can be produced.

The foamed polyarylene sulfides can be produced by the process according to the invention.

The foam formed can be open-pored.

Moldings can be produced from polyarylene sulfide foam. The moldings can be used as high-performance functional components, for example in aircraft and automobile construction. Other uses of the moldings are to be found in chemical apparatus construction. The foams or moldings can be used as insulating materials which are resistant to chemicals or heat.

Advantages of the process according to the invention for the production of foamed polymer structures are to be seen in the fact that no addition of low molecular weight blowing agents is necessary, the process is easy to carry out, no use of environmentally harmful blowing gases is necessary, polyarylene sulfide foams having a particularly low density are possible, and a wide range of degrees of foaming and of pore size can be established.

The invention is illustrated in more detail below for the expert by the embodiment examples, but without being limited to the embodiments described concretely.

EXAMPLES

1.) Preparation of Polyphenylene Sulfoxide 54.1 g of a polyphenylene sulfide powder (average molecular weight: 40,000) having an average particle diameter of $20\times10^{-6}$ m were suspended in 400 ml of water in a reaction vessel with a disk stirrer. Ozone-containing gas was passed into the suspension at temperatures of minus 5° to minus 7° C. until 0.5 mol of ozone had been taken up (72 minutes). The ozone concentration during the gassing was 51 to 115 g per cubic meter of gas. After the reaction, the polymer powder was filtered off and dried. Elemental analysis of this product showed a sulfur/oxygen ratio of 1:1.

2.) Production of a Foam of Polyphenylene Sulfoxide

A Petri dish of 10 cm diameter was filled to a level of about 0.5 cm with polyphenylene sulfoxide and heated in a closed oven in air at a heating-up rate of 10K/min to a temperature of 320° C. After the final temperature was reached, an open-pored foam, the density of which was 0.5 g/cm³, was formed. Subsequent ESCA analysis showed that the sulfoxide linking groups had been reduced completely.

3.) Production of a Foam of Polyphenylene Sulfide/Polyphenylene Sulfoxide

A mixture of 75% by weight of polyphenylene sulfide and 25% by weight of polyphenylene sulfoxide was introduced into a compression mold (ring of internal diameter 120 mm and solid cylinder of diameter 120 mm) and was heated up under a press (Polystat 2005, Schwabenthan, Berlin, Federal Republic of Gemany) to 320° C. under a pressure of 10 bar. The pressure was maintained at this temperature for 20 minutes and the product was cooled to about 50° C. under pressure and released from the mold. The molding had the shape of a circular sheet of 120 mm in diameter and 1.9 mm in thickness. The compression-molded sheet consisted of an open-pored foam with a closed surface. The density was 0.69 g/cm³.

We claim:

1. A process for the production of a polyarylene sulfide foam, which comprises heating at least one polyarylene sulfoxide or a mixture comprising one or more polyarylene sulfides and at least one polyarylene sulfoxide at a temperature in the range from 250° to 400° C.

2. The process as claimed in claim 1, wherein the polyarylene sulfoxide contains units of the formula —(—$C_6H_4$—SO—)—.

3. The process as claimed in claim 1, wherein the average molecular weight $M_w$ of the polyarylene sulfoxide is 4000 to 200,000.

4. The process as claimed in claim 1, wherein said polyarylene sulfoxide comprises polyphenylene sulfoxide, and wherein said mixture comprises polyphenylene sulfoxide and polyphenylene sulfide.

5. The process as claimed in claim 1, wherein heating is carried out at a temperature in the range from 280° to 360° C.

6. The process as claimed in claim 1, wherein the polyarylene sulfide foam is produced essentially without addition of an expanding agent.

7. The process as claimed in claim 1, wherein the mixture comprises 5 to 99.9 percent by weight of at least one polyarylene sulfoxide.

8. The process as claimed in claim 1, wherein the mixture comprises 10 to 99.9 percent by weight of at least one polyarylene sulfoxide.

9. A method of producing a molded article comprising the steps of heating at least one polyarylene sulfoxide or a mixture comprising one or more polyarylene sulfides and at least one polyarylene sulfoxide to a temperature in the range of 250° to 400° C.; obtaining a polyarylene sulfide foam as a result of said heating step; and molding the resulting polyarylene sulfide foam into a molded article.

* * * * *